Dec. 7, 1943. C. R. BACON 2,336,055
FLUID TRANSMISSION
Filed Feb. 12, 1941 2 Sheets-Sheet 1
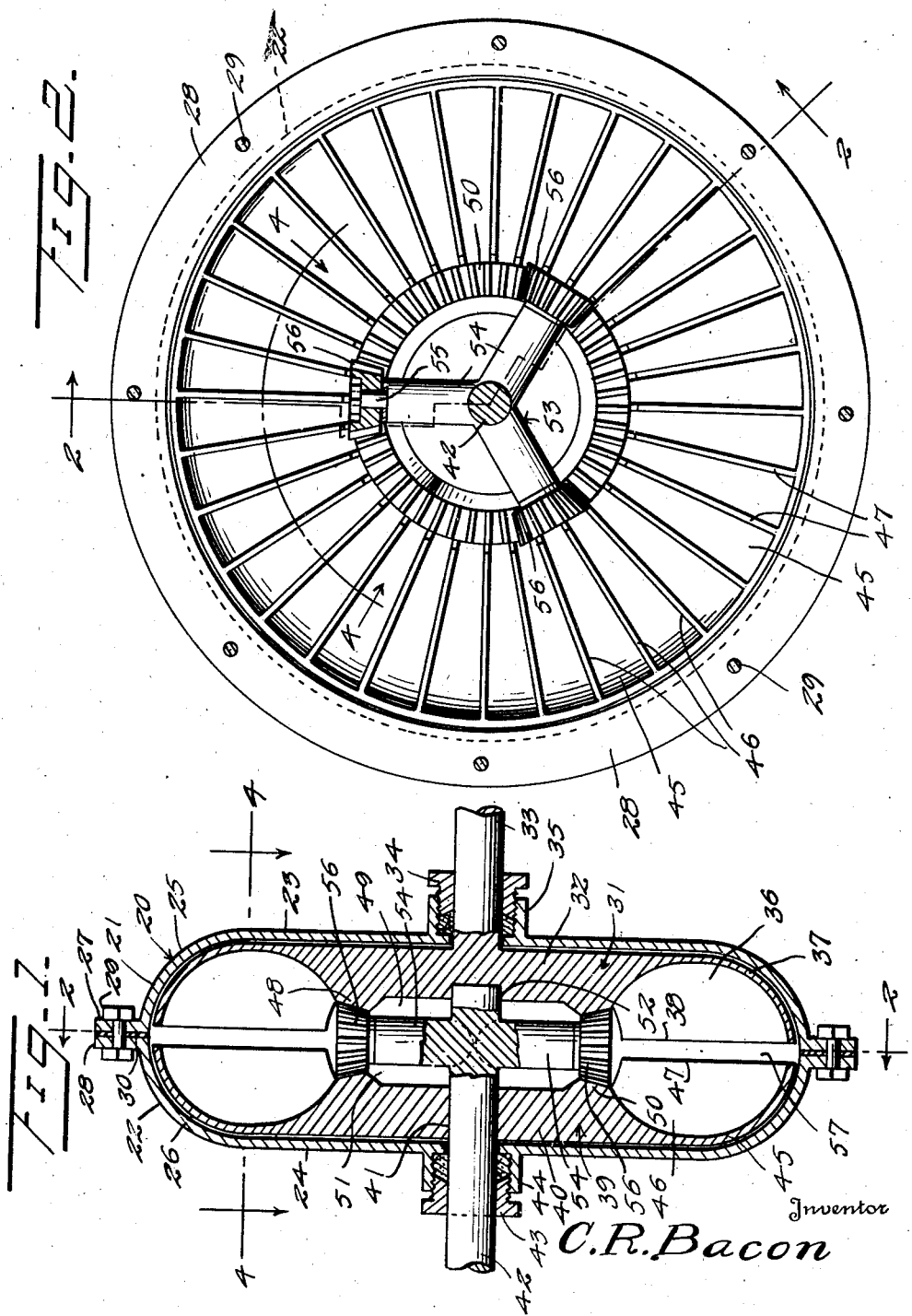
Inventor
C. R. Bacon
By Kimmel & Crowell
Attorneys Dec. 7, 1943.  C. R. BACON  2,336,055
FLUID TRANSMISSION
Filed Feb. 12, 1941  2 Sheets-Sheet 2
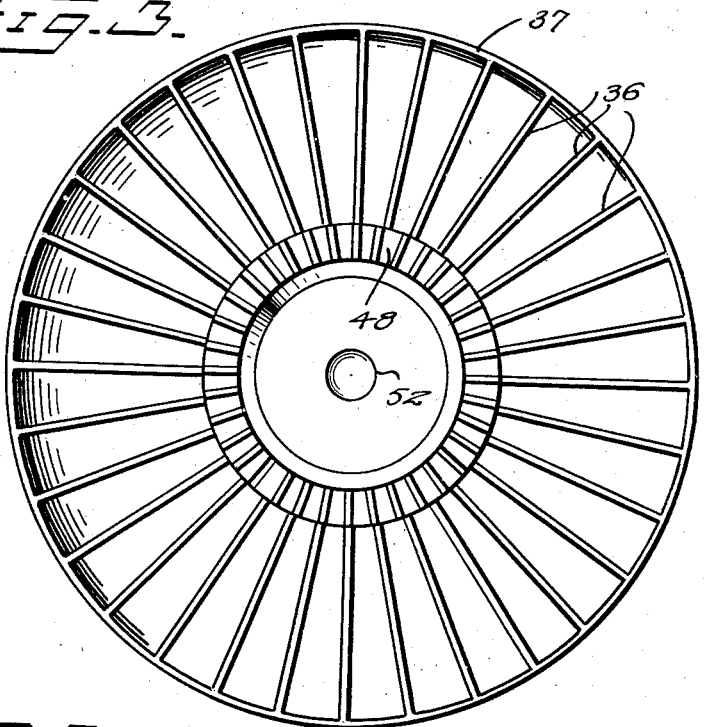
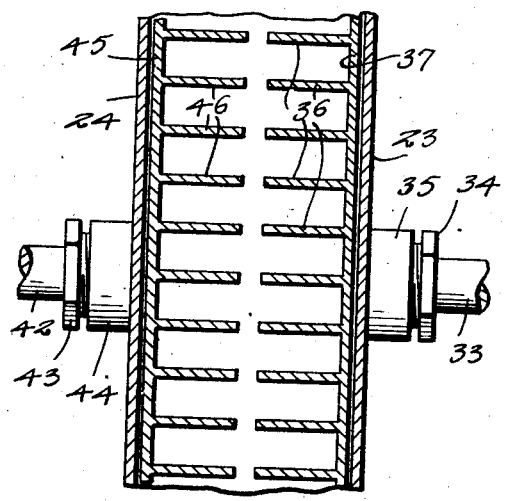
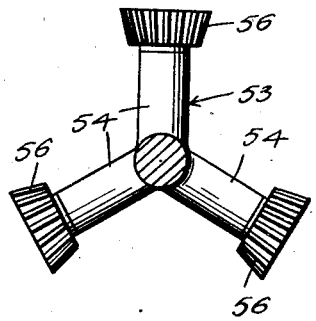
Inventor
C. R. Bacon
By Kimmel & Crowell
Attorneys Patented Dec. 7, 1943

2,336,055

UNITED STATES PATENT OFFICE 2,336,055

FLUID TRANSMISSION

Chester R. Bacon, Los Angeles, Calif., assignor of one-third to Byron R. Bentley, Hollywood, Calif.

Application February 12, 1941, Serial No. 378,683

2 Claims. (Cl. 74—189.5)

This invention relates to a fluid coupling or transmission between driving and driven elements.

An object of this invention is to provide a fluid coupling or transmission of this kind wherein the coupling between driving and driven shafts is accelerated, the acceleration of the coupling being accomplished by means of constantly meshing gears operating in the fluid, the variation in the ratio of the gears affecting the degree of acceleration.

Another object of this invention is to provide a coupling or transmission of this type wherein the initial rotation of the driven shaft is effected through a reverse rotation of one of the coupling elements, and in which the speed of such reverse rotation will determine the initial speed of rotation and pick-up of the driven shaft.

A further object of this invention is to provide the combination of constantly meshing planetary gearing with a pair of fluid coupling elements wherein various types of mechanical gearing may be combined with the fluid coupling elements, the particular type of mechanical gearing depending upon the results desired and the particular character of the installation.

A still further object of this invention is to provide a coupling or transmission wherein the mechanical gearing will be effective and in operation at starting or low speeds, but wherein the mechanical gearing is made gradually inoperative or ineffective as the speed of rotation of the driven shaft approaches or equals the speed of rotation of the driving shaft.

A further object of this invention is to provide a coupling or transmission which will automatically compensate itself for the load applied to the driven element, so that under abnormal load conditions the inoperative mechanical gearing will be made operative to the degree necessary to take care of such abnormal load conditions.

A further object of this invention is to provide a coupling or transmission of this type which is so constructed that the maximum power may be exerted at the starting speed of the driven shaft due to the positive rotation of the hydraulic elements through the mechanical gearing.

To the foregoing objects and to others which may hereinafter appear, the invention consists of the novel construction, combination and arrangement of parts as will be more specifically referred to and illustrated in the accompanying drawings wherein are shown embodiments of the invention, but it is to be understood that changes, variations and modifications may be resorted to which fall within the scope of the invention as claimed.

In the drawings:

Figure 1 is a longitudinal section partly broken away and in elevation of a fluid transmission or coupling constructed according to an embodiment of this invention.

Figure 2 is a sectional view taken on the line 2—2 of Figure 1.

Figure 3 is an inner elevational view of the primary or driving element.

Figure 4 is a fragmentary sectional view taken on the line 4—4 of Figure 1.

Figure 5 is a side elevation partly in section of the planetary gear carrier.

Referring to the drawings and first to Figures 1 to 5, inclusive, the numeral 20 designates generally an annular housing formed of complementary housing members 21 and 22. The housing members 21 and 22 are provided with flat side walls 23 and 24, respectively, which at their outer portions merge in arcuate wall portions 25 and 26. The arcuate wall portion 25 is formed with an annular flange 27 and the arcuate wall portion 26 is formed with an annular flange 28. The flanges 27 and 28 are secured together by fastening devices 29 and preferably a gasket or sealing member 30 is interposed between the flanges 27 and 28 so as to prevent the leakage of any fluid which may be disposed within the housing 20.

A primary hydraulic driving element generally designated as 31 is rotatably disposed within the housing 20 and comprises an inner substantially disc-like body 32, which is fixed at the center thereof to a drive shaft 33. The drive shaft 33 extends through a gland or sealing member 34, which is mounted in an annular boss 35 carried by the side wall 23. The primary or driving element 31 is provided with a plurality of radial blades 36, which are carried by an arcuate wall 37 formed integral with the body 32. The arcuate wall 37 engages closely within the concave portion of the arcuate wall 25 and each blade 36 at its inner end is provided with a substantially straight edge 38.

A secondary or driven hydraulic element 39 is disposed within the housing 20 in a confronting position with respect to the primary or driving element 31 and comprises a substantially disc-shaped body 40, which is provided centrally thereof with an opening 41 through which a driven shaft 42 loosely engages. The shaft 42 rotatably engages through a packing gland 43, which is carried by an annular boss or bushing 44 formed integral with the side wall 24.

The body 40 has formed integral therewith an outwardly extending arcuate wall 45 which engages closely about the inner concave surface of the arcuate wall 26 of the housing 20 and is positioned in confronting relation to the arcuate wall or extension 37. A plurality of radially arranged blades 46 are formed integral with the wall 45 and also with the body 40. The blades 46 are provided with substantially straight inner edges 47 which are positioned in slightly spaced relation to the inner edges 38 of the blades 36.

The primary or driving element 31 is formed with an inwardly offset annular series of gear teeth 48 which form a liquid chamber 49 inwardly from the blades 36. The secondary or driven element 39 is also provided with an annular series of inwardly offset gear teeth 50 which with the inner face of the body 40 form a liquid chamber 51 complementary to the liquid chamber 49 and communicating with the chamber 49. The body 32 in the axial center thereof is provided with a socket or recess 52 within which the inner end of the driven shaft 42 is adapted to rotatably engage so that the inner end of the shaft 42 will be rotatably supported from the driving element 32.

The driven shaft 42 within the two chambers 49 and 51 has secured thereto or formed integral therewith a planetary gear carrier generally designated as 53. The gear carrier 53 is constructed in the form of a plurality of radially arranged arms 54 which are fixed to or formed integral with the shaft 42 outwardly from the inner end thereof. Each arm 54 at its outer end has fixed thereto a pin or trunnion 55 on which a planetary gear or pinion 56 is rotatably mounted. The gear carrier 53 in the present instance is provided with three arms 54 and there is a gear 56 rotatably mounted on each of the three arms 54.

The planetary gears or pinions 56 are adapted to mesh with the gear teeth 48 and 50 and these gears 56 provide a means whereby a reverse torque strain or action is exerted on the secondary or driven element 39. The ratio of the gears 56 with respect to the gear teeth 48 and 50 provide the desired acceleration of the movement or rotation of the secondary or driven element 39 with respect to the primary or driving element 31. In the present instance the outer edges of the blades 36 and 46 are of arcuate configuration and the two arcuate extensions 37 and 45 form a substantially cylindrical liquid chamber 57 within which the liquid used in this device is adapted to be positioned. The liquid is also positioned within the two chambers 49 and 51.

In the use and operation of this transmission and referring first to the transmission shown in Figures 1 to 5, inclusive, the drive shaft 33 may be connected in any suitable manner to a drive means and the driven shaft 42 may be connected to a suitable driven means. It will be understood that a suitable reversing gear structure may if desired be combined with the transmission herein disclosed and may be connected with either the driving or driven end thereof. The housing 20 is adapted to be completely filled with a suitable liquid such as oil and upon rotation of the driving shaft 33 in one direction, the liquid in the housing will be centrifugally thrown outwardly and into contact with the driven blades 46 of the secondary or driven element 39. Upon rotation of the primary element 31 in one direction, the driven or secondary element 39 will be initially rotated in a reverse direction due to the interposed planetary gears 56 which are in constant mesh with the ring gears 48 and 50. The force of the liquid thrown from the blades 36 against the blades 46 will tend to retard the rotation of the secondary element 39, the reverse rotation of the secondary or driven element 39 being gradually decreased as the driven shaft 42 begins to rotate until the driven element 39 rotates at substantially the same speed and in the same direction as the driving or primary element 31.

By providing a mechanical means in the form of the planetary gears 56 for rotating the secondary element 39, the time within which the secondary element 39 will rotate at the same speed and in the same direction as the primary element 31 will be accelerated. This is due in part to the fact that when the secondary element 39 is initially rotated in a reverse direction, this secondary element 39 in itself becomes a second primary driving element for centrifugally forcing the liquid carried between the blades 46 outwardly in the same manner as the liquid between the blades 36 is forced outwardly and upwardly. By thus providing for the positive rotation of the two hydraulic elements 31 and 39, the initial power exerted on the driven shaft 42 will be greater than would be the case if these two hydraulic elements were not mechanically coupled together as hereinbefore described.

Where this transmission is connected with a motor vehicle, the drive shaft 33 will be connected with the drive shaft of the vehicle, and after the two hydraulic elements are rotating together as a unit, in the event undue, extra heavy load strain is applied to the driven shaft, as where the vehicle is going uphill or when starting, the driven hydraulic element may in each case rotate at a slightly reduced speed from the driving element through rotation of the planetary gears which will effect a reverse tortional strain on the driven element and when the abnormal load has been removed from the driven shaft, the two shafts will rotate as a unit and the two hydraulic elements will also rotate as a unit with the planetary gears stationary relative to the annular or ring gears of the driving and driven hydraulic elements.

What I claim is:

1. A fluid transmission comprising a stationary housing, a drive shaft journaled through one wall of said casing and terminating within said casing, a hydraulic driving element in said casing and fixed on said shaft, said element including a disc-shaped body formed with a plurality of radially arranged inwardly facing blades in the outer portion thereof, an annular gear on the inner face of said body adjacent the inner ends of said blades, a driven shaft aligning with said drive shaft and journaled through another wall of said housing, a hydraulic driven element loose on said driven shaft, said driven element including a disc-shaped body formed with a plurality of radially arranged inwardly facing blades in the outer portion thereof opposing said first-named blades, an annular gear on the inner face of said second body confronting said first-named annular gear, said first body having an axial bearing on the inner face thereof and the inner end of said driven shaft rotatably engaging in said bearing, a pinion carrier carried by said driven shaft between said bodies, and pinions rotatably carried by said carrier and meshing with said first and second named annular gears.

2. A fluid transmission comprising a stationary housing, a drive shaft journaled through one wall of said casing and terminating within said casing, a hydraulic driving element in said casing and fixed on said shaft, said element including a disc-shaped body formed with a plurality of radially arranged inwardly facing blades in the outer portion thereof, an annular gear on the inner face of said body adjacent the inner ends of said blades, a driven shaft aligning with said drive shaft and journaled through another wall of said housing, a hydraulic driven element loose on said driven shaft, said driven element including a disc-shaped body formed with a plurality of radially arranged inwardly facing blades in the outer portion thereof opposing said first-named blades, an annular gear on the inner face of said second body confronting said first-named annular gear, said first body having an axial bearing on the inner face thereof and the inner end of said driven shaft rotatably engaging in said bearing, a pinion carrier fixed relative to said driven shaft and disposed between said bodies, said carrier comprising a plurality of radially arranged arms, stub shafts carried by the outer ends of said arms, and pinions rotatably carried by said stub shafts and meshing with said annular gears.

CHESTER R. BACON.